United States Patent [19]

Pritchett

[11] 4,215,877
[45] Aug. 5, 1980

[54] FOLDING UTILITY CART

[76] Inventor: George Pritchett, Rte. 4, Box 61A, Gilmer, Tex. 75644

[21] Appl. No.: 905,159

[22] Filed: May 12, 1978

[51] Int. Cl.² .......................................... B62B 11/00
[52] U.S. Cl. ................................. 280/652; 403/291
[58] Field of Search ............... 280/652, 654, 655, 659, 280/47.24, 47.26, 179, A, 79.2, 79.3; 52/645, 446; 403/109, 291, 377

[56] References Cited

U.S. PATENT DOCUMENTS

| | | | |
|---|---|---|---|
| 314,185 | 3/1885 | Knowlton | 280/47.37 R |
| 320,015 | 6/1885 | Taft | 280/47.24 |
| 1,348,145 | 8/1920 | Arden | 403/291 |
| 2,919,058 | 12/1959 | Thompson | 224/29 R |
| 3,222,100 | 12/1965 | Lindzy | 280/652 |
| 3,407,959 | 10/1968 | Mondineu | 280/79.2 |
| 4,008,669 | 2/1977 | Sumrell | 280/179 A |

Primary Examiner—Robert R. Song

Attorney, Agent, or Firm—Robert D. Farkas

[57] ABSTRACT

A folding utility cart utilizes a plurality of elongated members, each having portions thereof engageable into one another and disengageable from one another so as to be folded up into a compact length when the cart apparatus constructed therefrom is in a storage condition. The portions each are made up from tubular members having an elastic member passing therethrough, connecting the portions together and biasing the portions towards one another at ends thereof adapted to partially telescope into each other in a slip-fit. The cart has pivotable handle means acting as a stand in one position and as an upright handle in another, connected to a major frame portion. A pair of wheels are suspended below the frame member, utilizing disengageable portions whereby the entire apparatus, when assembled, provides a cart-like apparatus having straps attached thereto for securing game or other heavy objects on a fabric-like sheet attached to the cart.

9 Claims, 3 Drawing Figures

FOLDING UTILITY CART

BACKGROUND OF THE INVENTION

1. The Field of the Invention

This invention relates to wheeled carts and more particularly to that class being capable of being folded into a compacted condition.

2. Description of the Prior Art

The prior art abounds with carts for carrying about game and other heavy objects. U.S. Pat. No. 2,979,338 issued Apr. 11, 1961 to A. J. Dwyer discloses a game cart having a central wheel member, a pair of handle-like members and a bed member whereby each of such members are adapted to be joined together into an assembled cart and separated when in a nonuse condition. However, the Dwyer apparatus provides a quantity of loose components when such apparatus is in such non-use condition. U.S. Pat. No. 2,992,834 issued July 18, 1961 to E. A. Tidwell et al. teaches a game cart having a three piece assembly in which a handle portion, a body portion and a wheel assembly are adapted to be bolted together so as to form a wheelbarrow apparatus upon which game can be carried. As in the case of the Dwyer apparatus, the Tidwell disclosure utilizes loose components during the time that the apparatus is disassembled.

U.S. Pat. No. 3,860,254 issued Jan. 14, 1975 to H. W. Wegener described a foldable packer vehicle utilizing a central wheel about which a foldable tubular framework is secured, which when folded up provides an apparatus having less bulk than when the apparatus is in the unfolded condition. However, when in such folded condition the device occupies a considerable amount of space, nevertheless, and requires a substantial amount of alignment efforts to bring the apparatus into an unfolded use condition.

SUMMARY OF THE INVENTION

A primary object of the present invention is to provide a foldable utility cart which folds into a compact size when not in use.

Another object of the present invention is to provide a cart having great strength, capable of carrying large bulky objects over the roughest terrain when assembled.

Still another object of the present invention is to provide a cart which may be assembled with great ease, and without tools.

Yet another object of the present invention is to provide a cart which virtually springs into its expanded assembled condition when released from a storage condition.

A further object of the present invention is to provide a cart wherein all of the components thereof are attached to one another when such components are released from locked engagement with one another.

Another object of the present invention is to provide a cart which may be assembled in cold weather, even when wearing heavy gloves or mittens.

Still another object of the present invention is to provide a cart wherein such cart may have a four point support, for resting on the earth, if desired.

Yet another object of the present invention is to provide a cart having a handle portion, useful for wheeling such cart from place to place.

A further object of the present invention is to provide a cart having only a pair of wheels for engagement with rough terrain, thereby facilitating easy transportation of heavy objects thereon.

Another object of the present invention is to provide a cart having a sieve-like sheet for resting an animal carcass therein which permits body fluids to easily pass therethrough.

Still another object of the present invention is to provide a cart which may be fabricated from conventional components, be rugged in construction, durable and totally effective for its intended purpose.

Transporting animal carcasses or disabled persons over terrain represents a substantial problem because of the great weight of such objects and because of the unevenness of the terrain. These facts, coupled with the fact that many hunters operate alone requires that a cart apparatus of lightweight design be extremely rugged in construction and have the capability of being operated by one individual under all weather conditions. The assembly of the cart may be made substantially simpler if the use of nuts and bolts and other fastening devices are eliminated.

A heavy load may be carried from place to place by utilizing a pair of wheels in contact with the terrain. During such transportation, the cart is essentially balanced on the wheels. When it is desired to rest the cart, it is best to maintain the platform portion of the cart in a near horizontal position. Therefore, the handle portion, pivotably secured to the frame portion of the cart, is best utilized as supporting legs when such handle portion is no longer required in propelling the cart from place to place. When the cart is to be utilized as an animal carcass conveyance, a sieve-like flexible sheet can be employed so as to permit body fluids, such as blood, to seep therethrough thereby lightening the load during the wheeling process. Gun cases and other auxiliary equipment may be carried on the edges of the frame portion of the cart which also has straps affixed thereto, utilized to securely engage the load onto the frame portion of the cart.

These objects as well as other objects of the present invention will become more readily apparent after reading the following description of the accompanying drawings.

DESCRIPTION OF THE PREFERRED EMBODIMENT

Figure 1:
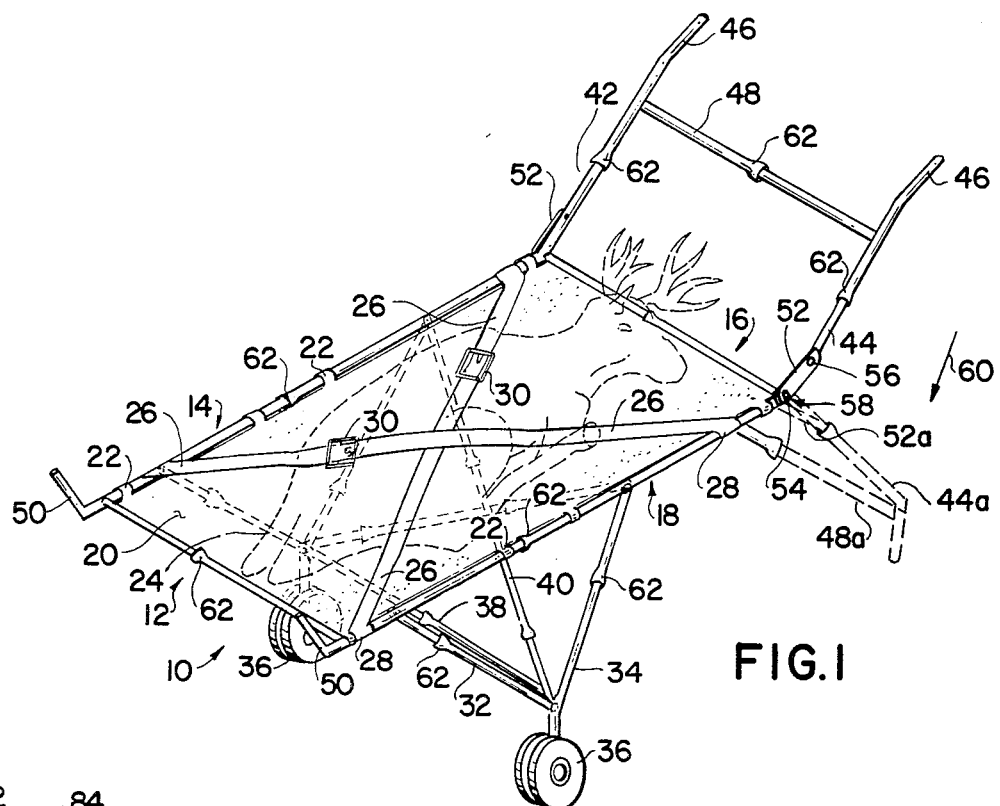
FIG. 1 is a perspective view of the present invention shown in assembled condition.

The structure and method of fabrication of the present invention is applicable to a rectangular frame-like portion of a cart fabricated from four elongated members, each having a pair of portions adapted to be joined to one another with a slip-joint type fitting. The same slip-joint type fitting is employed with a pair of truss-like members, each having smaller portions, and each being attached to opposed elongated members of the frame portion of the cart. Truss members, having an X-like shape, and a cross bar member are each adapted with the slip-fit joint. A pair of wheels are affixed to the leg-like truss members providing a wheeled base for the cart. A pair of handles are pivotably secured to the frame portion of the cart, each being joined by another cross bar member and each, including the cross bar pivotably secured thereto, having the same slip-fit joint to the subportions thereof. A pair of arms are pivotably secured to the handle portions and are engageable to the opposed side members of the frame portion of the cart so as to position the handle members in an upward and outward position from the frame portion of the cart or in an outward and downward position, acting as legs, from the cart, when it is desired to maintain the cart in a near horizontal condition. A flexible sheet, fabricated from a cloth-like material, such as canvas, is attached to the frame portion of the cart utilizing a plurality of straps therefor. Holding straps, equalling four in number, are secured to the frame portion of the cart and employ a pair of buckles so as to be useful in securing an animal carcass or the like, when such carcass is resting on the flexible sheet. The flexible sheet is provided with small openings so as to permit body fluids to pass therethrough.

Each of the rigid elongated elements of the cart assembly, comprising all of the elongated elements thereof, save for the pair of arms, are fabricated from hollow tubular portions in which one portion has a uniform outside diameter and the other portion has one end thereof slightly enlarged for receiving a short length of the uniform diameter portion therein. When so engaged, the uniform diameter portion forms a loose fit into the slightly enlarged end of the nonuniform diameter portion. A flexible resilient material, such as a rubberized shock cord is inserted passing through both portions of each elongated member and has the end thereof secured to the remote ends of the tubular portions. The shock cord is prestressed so as to cause adjacent ends of the tubular portions to be urged into sliding contact with one another. However, when it is desired to fold up the tubular portions, a force exerted in opposite direction on the tubular portions causes them to become disengaged from one another and allows such portions to be positioned in side by side relationship, thereby allowing the elongated member to be positioned in a folded up shape. Since all the elongated members of the present invention are provided with the slip type joint described, the entire apparatus may be folded up into a compact shape. The straps, utilized to secure the animal carcass on the flexible sheet portion of the cart, may be utilized to maintain the components in such folded up condition. When it is desired to assemble the cart, the straps are released and the shock cords passing through the tubular portions of each elongated member tend to align such tubular portions into coaxial arrangement whereby the prestressing of the shock cord causes the tubular portions to practically snap into sliding engagement and practically, if not totally, automatically assemble the cart into an erected condition. A gentle shaking action, exerted on the metallic portions of the apparatus, can cause the entire apparatus to be disposed in an erected condition. In such condition the cart is ready for use, relying only upon a moderate force on each shock cord element to maintain such cart in the erected condition. Thus, no tools are required for assembly and during disassembly only an oppositely directed force, applied to the tubular portions, followed by folding such tubular portions into side by side relationship, allows the cart elements to be folded up into a storage condition, suitable for carrying about in the trunk compartment of a motor vehicle. The arm portions of the apparatus employ a rivet-like pivot arm at one end thereof and a slotted opening for use with a projecting rivet-like pin attached to the handle portion of the cart. In this manner, the handle portion may be maintained in a preferred position upwardly and outwardly from the frame portion of the cart or outwardly and downwardly in a leg-like position when it is desired to position the cart at rest. The carcass holding straps may be provided with buckles or other fasteners, if desired. A pair of gun cases may be removeably affixed to the sides of the foldable frame portion of the cart, utilizing fasteners of any type well known in the art, if desired. Lightweight aluminum tubing may be employed, thereby minimizing the capability of the apparatus rusting when exposed to rain. Because each elongated member is fitted with the slip type joint, the entire apparatus may be folded up into a shape no greater than two feet in length and having a diameter less than one foot. However, when the apparatus is erected, it is capable of carrying a full grown buck or other carcass of great size and weight.

Now referring to the figures, and more particularly to the embodiment illustrated in FIG. 1 showing the present invention 10 having frame elongated members 12, 14, 16 and 18, forming a rectangle and having flexible sheet member 20 disposed secured thereto utilizing loop-like straps 22. Dotted lines 24 simulate an animal carcass resting on sheet 20 and is secured thereon, utilizing flexible cloth-like straps 26. The flexible straps are secured at one end thereof to elongated members 14 and 18, utilizing loop-like portions 28. Buckles 30 secure the ends of straps 26 together. Elongated members 32 and 34, secured to elongated member 18, are identical to another pair of elongated members, not shown, affixed to elongated member 14, forming a V-like shape and having wheels 36 affixed to the ends thereof and journaled thereto. Elongated member 38 extends parallel to elongated members 12 and 16 and joins together elongated members 32 and 34, and the pair of elongated members, not shown, equivalent to elongated members 32 and 34 that are secured to elongated member 14. Elongated member 40 extends upwardly from the intersection of elongated members 32 and 34 and is secured to elongated member 14. Elongated member 32 is pivotably secured to elongated member 34, both being pivotably secured to elongated member 18. Elongated members 38 and 40 are pivotably secured to one another and to elongated members 32 and 34, utilizing pivot rods, not shown, therefor. Elongated members 42 and 44 are pivotably secured to elongated members 14 and 18, adjacent the ends of elongated member 16 and are provided with ends 46 disposed slightly bent relative to the longitudinal axis of the remaining portions of their length. Elongated member 48 is pivotably secured to elongated members 42 and 44 and extends parallel to elongated member 16. Ends 50, located at the free ends of elongated member 14 and 18, are bent upwardly relative to the plane defined by elongated members 12, 14, 16 and 18. Arms 52 are pivotably secured to elongated members 14 and 18, utilizing rivet-like pin 54 therefor. The other end of arms 52 are pivotably secured to elongated members 42 and 44, utilizing rivet 56 therefor. Rivet-like pin 54 engages slot 58, maintaining elongated members 42 and 44 in the upright use position shown. When ends 46 of elongated members 42 and 44 are permitted to move downwardly in the direction of arrow 60, elongated member 44 is shown in the position denoted by dotted lines 44a. Bar 52 is then rotated so as to occupy the position by dotted lines 52a, securing elongated member 44 in the position shown by dotted lines 44a, permitting present invention 10 to be maintained in a horizontal position. Elongated members 12, 14, 16, 18, 42, 44, 32, 34, 38, 40, 48 are each formed from two elongated member portions having a slip type joint 62 therebetween. Thus, such elongated members may be folded in half by separating the adjacent elongated member portions and causing them to reside in side by side relationship, if desired. Since all elongated members that are secured to one another are secured together pivotably, the remaining portions of the present invention 10 may be positioned in sensibly side by side relationship forming a bundle of components, accepting straps 26, buckles 30, arms 52 and flexible sheet 20. Since the only rigid elements comprising the last main components include arms 52, the remaining portions of the apparatus, with the exception of wheels 36, may be folded up with great ease. Wheels 36, possessing the small size, may be likewise located in a preferred position as desired. It should be noted that wheels 36 are journaled to elongated member 34.

Figure 2:
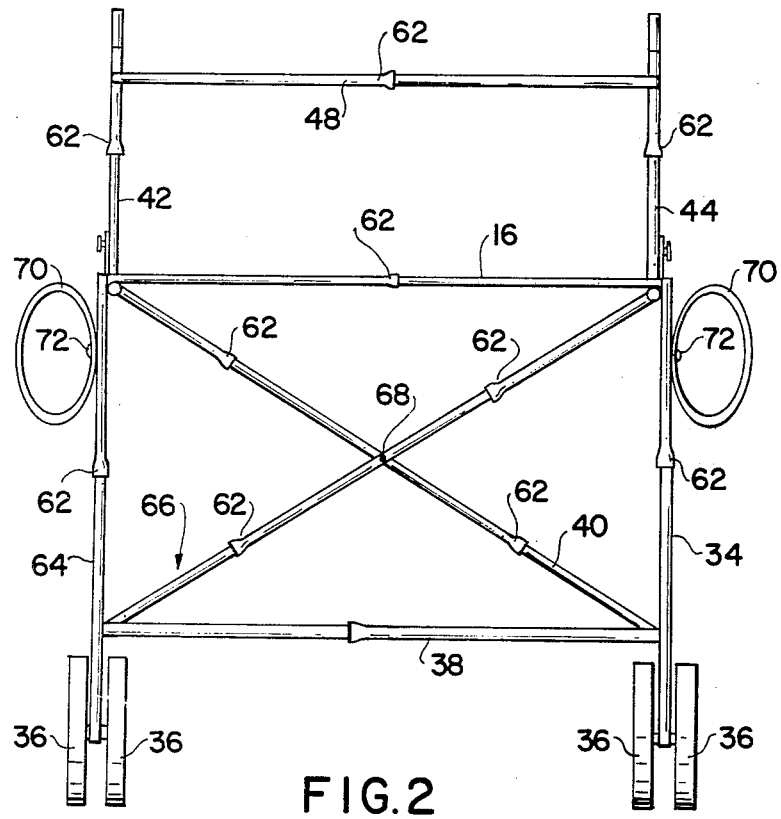
FIG. 2 is a rear elevation view of a portion of the present invention.

FIG. 2 illustrates elongated member 64, in opposite relationship with elongated member 34, and serving the same supporting function therefor. Truss-like elongated member 66, is disposed annularly with truss-like elongated member 40, being pivotably secured thereto, utilizing pivot rod 68 therefor. It should be noted that elongated members 64 and 66 are provided with slip type joints 62. Gun cases 70 are secured to the sides of elongated members 34 and 64 utilizing fasteners 72 therefor.

Figure 3:
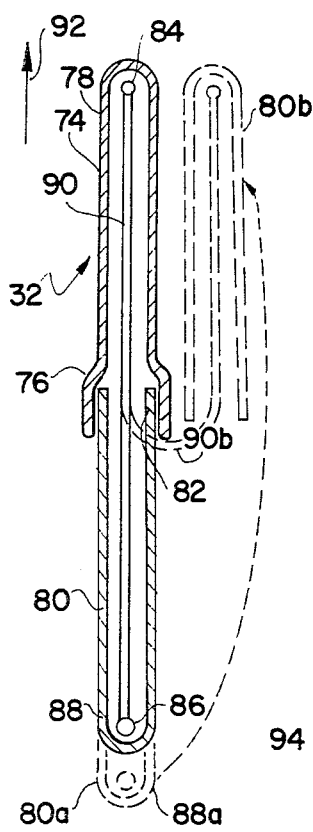
FIG. 3 is a cross-sectional view of a component of the present invention.

FIG. 3 illustrates a typical elongated member, as shown in FIG. 1, illustrative of say elongated member 32 shown therein. Such elongated member is formed from portion 74, having end 76 thereof with a larger outside diameter than end 78. Portion 80 is shown disposed having a uniform outside diameter and has end 82 thereof disposed residing in end 76 of portion 74. Pivot rod 84, disposed at end 78 of portion 74 and pivot rod 86, disposed at end 88 of portion 80, may be used to pivotably secure elongated element 32 to elongated member 18 and elongated member 34, shown in FIG. 1. Additionally, such pin members join together the ends of shock cord 90 held in a relative taut position thereby. In this fashion, elongated member 30 is maintained in an assembled condition. When a force is applied to portion 74, in the direction of arrow 92 and when a simultaneous force is applied in the opposite direction to portion 80, portion 80 has end 82 thereof pulled outwardly from end 76 of portion 74, causing plastic flexible member 90 to expand in length and causing portion 80 to reside in the position shown by dotted lines 80a. When a force is applied to end 88a of portion 80, shown in position 80a, in the direction of arrow 94, portion 80 is disposed residing in the position shown by dotted lines 80b. Here, portion 80 is disposed in side by side relationship with portion 74, having portion 90b of the shock cord exposed. When the portion 80 is released from the position shown by dotted lines 80b, shock cord 90 causes portion 80 to straighten out and to be pulled into alignment with portion 74 so as to automatically align such components into elongated element 32. If desired, plastic member 90 may be stretched into any desired length, so as to allow portions 74 and 80 to be positioned at any regular relationship and distance relative to one another, consistent with the convenient folding up of the present invention 10, shown in FIG. 1.

One of the advantages of the present invention is a foldable utility cart which folds into a compact size when not in use.

Another advantage of the present invention is a cart having great strength, capable of carrying large bulky objects over the roughest terrain when assembled.

Still another advantage of the present invention is a cart which may be assembled with great ease, and without tools.

Yet another advantage of the present invention is a cart which virtually springs into its expanded assembled condition when released from a storage condition.

A further advantage of the present invention is a cart wherein all of the components thereof are attached to one another when such components are released from locked engagement with one another.

Another advantage of the present invention is a cart which may be assembled in cold weather, even when wearing heavy gloves or mittens.

Still another advantage of the present invention is a cart wherein such cart may have a four point support, for resting on the earth, if desired.

Yet another advantage of the present invention is a cart having a handle portion, useful for wheeling such cart from place to place.

A further advantage of the present invention is a cart having only a pair of wheels for engagement with rough terrain, thereby facilitating easy transportation of heavy objects thereon.

Another advantage of the present invention is a cart having a sieve-like sheet for resting an animal carcass therein which permits body fluids to easily pass therethrough.

Still another advantage of the present invention is a cart which may be fabricated from conventional components, be rugged in construction, durable and totally effective for its intended purpose.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

I claim:

1. A folding utility cart comprising a first group of elongated members forming a rectangular open frame, a flexible sheet, said flexible sheet secured to said first group of elongated members, a second group of elongated members, said second group of elongated members each being pivotably secured at one end thereof to one side of said open frame, a first wheel, said first wheel being journalled to the other end of said second group of elongated members, a third group of elongated members, one end of each of said third group of elongated members being pivotably secured to the other side of said open frame, a second wheel, said second wheel being journalled to the other end of each of said third group of elongated members, a fourth group of elongated members disposed forming a handle frame, said handle frame being angularly adjustably connected to one end of said open frame, each of said elongated members of said first group and said second group and said third group and said fourth group of elongated members having portions thereof elastically joined together, each of said first and said second and said third and said fourth groups of elongated members having a first portion thereof and a second portion thereof, one end of said first portion thereof, having a greater inside diameter than an adjacent end of said second portion, an elastic cord, said first portion and said second portion having a hollow passageway therein, said elastic cord disposed in said hollow passageway of said first portion and said second portion, the ends of said elastic cord secured to the other end of said first portion and the end of said second portion opposite said adjacent end, whereby said elastic cord is tensioned when said first portion and said second portion are disposed in coaxial alignment having said adjacent end residing in said one end.

2. The apparatus as claimed in claim 1 further comprising a plurality of straps, one end of each of said plurality of straps secured to said first plurality of elongated members, means to removeably secure the other end of said plurality of straps to each other.

3. The apparatus as claimed in claim 1 wherein said means to secure comprises at least one arm, one end of said arm pivotably secured to one of said elongated members of said third plurality of elongated members, the other end of said arm having a slot therein, a pin-like rivet, said pin-like rivet fixedly secured to one of said elongated member of said first plurality of elongated members whereby engaging said rivet-like pin in said slot maintains said at least one of said elongated members of said third plurality of elongated members in the defined angular relationship with said at least of said elongated members of said first plurality of elongated members.

4. The apparatus as claimed in claim 1 further comprising at least one gun case, said at least one gun case secured to said second plurality of elongated members.

5. The apparatus as claimed in claim 1 wherein said first portion and said second portion comprise tubing.

6. The apparatus as claimed in claim 1 further comprising a pivot rod, said pivot rod being disposed passing through said first portion.

7. The apparatus as claimed in claim 1 wherein said third plurality of elongated members may be selectively positioned upwardly and outwardly and downwardly from said first plurality of elongated members.

8. The apparatus as claimed in claim 7 wherein said first plurality of elongated members are disposed residing substantially in a horizontal plane when said wheels and when said third plurality of elongated members are disposed residing outwardly and downwardly from said first plurality of elongated members resting on a horizontal supporting surface.

9. The apparatus as claimed in claim 1 wherein said flexible sheet has a plurality of sieve-like openings therein.

* * * * *